United States Patent
Moran, III et al.

(10) Patent No.: US 6,377,552 B1
(45) Date of Patent: *Apr. 23, 2002

(54) SYSTEM, DEVICE, AND METHOD FOR EVALUATING DYNAMIC RANGE IN A COMMUNICATION SYSTEM

(75) Inventors: John L. Moran, III, Millville; Bruce O. Cox, Walpole, both of MA (US); William Leslie Brown, Mississauga (CA)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/920,464

(22) Filed: Aug. 29, 1997

(51) Int. Cl.$^7$ .......................... H04L 12/26; H04B 10/08
(52) U.S. Cl. ..................... 370/241; 370/251; 359/110; 375/227; 379/6
(58) Field of Search ................................ 370/241, 247, 370/251, 252; 324/76.11, 76.12, 76.19; 375/224, 227, 231, 254, 284, 285; 379/6; 359/110

(56) References Cited

U.S. PATENT DOCUMENTS

| | | | | |
|---|---|---|---|---|
| 3,862,380 A | * | 1/1975 | Hekimian et al. | 379/6 |
| 4,273,970 A | * | 6/1981 | Favin et al. | 324/76.12 |
| 4,417,337 A | * | 11/1983 | Favin et al. | 714/714 |
| 4,556,841 A | * | 12/1985 | Carlson | 324/73.1 |
| 4,768,203 A | * | 8/1988 | Ingle | 375/227 |
| 5,265,151 A | * | 11/1993 | Goldstein | 379/93.32 |
| 5,808,463 A | * | 9/1998 | Nagano | 324/76.21 |

OTHER PUBLICATIONS

Gimlin, D.R., Patisaul, C.R.; "On Minimizing the Peak-to-Average Power Ratio for the Sum of $f$ Sinusoids"; IEEE Transactions on Communications, vol. 41, Apr. 1993. p.631–635.

Boyd, Stephen; "Multitone Signals with Low Crest Factor"; IEEE Transactions on Communicatins, vol. CAS–33, No. 10, Oct. 1986, p.1018–1022.

*IEEE Standard Equipment Requirements and Measurement Techniques for Analog Transmission Parameters for Telecommunications.* Transmission System and Access Committee of the IEEE Communications Society (IEEE Std 743–1995). Sep. 1996. pp. 58–70, 99–103 Annex A, 123–124 Annex H, 8–12.

* cited by examiner

*Primary Examiner*—Wellington Chin
*Assistant Examiner*—Steven Nguyen
(74) *Attorney, Agent, or Firm*—Joanne N. Pappas; Jeffrey T. Klayman

(57) ABSTRACT

A system, device, and method for evaluating dynamic range in a communication system utilizes a narrow band multiple tone test signal for emulating a wide band composite signal equivalent to the symbol rate bandwidth of a digitally modulated carrier. The multiple tone test signal is constructed such that a significant portion of the third order intermodulation distortion products fall within the channels adjacent to the test channel so that the dynamic range can be evaluated with a commercially available industry standard CATV analyzer using a standard adjacent channel power measurement technique.

8 Claims, 3 Drawing Sheets

SYSTEM, DEVICE, AND METHOD FOR EVALUATING DYNAMIC RANGE IN A COMMUNICATION SYSTEM

BACKGROUND

1. Field of the Invention

The invention relates generally to communication systems and, more particularly, to testing the dynamic range of a fiber-optic communication system.

2. Discussion of Related Art

In today's information age, there is an increasing need for high speed communications for an ever-increasing number of communications consumers. To that end, communications networks and technologies are evolving to meet current and future demands. Specifically, new networks are being deployed which reach a larger number of end users, and protocols are being developed to utilize the added bandwidth of these networks efficiently.

In order to meet the communications demands of its customers, many cable companies are planning to support new information services such as voice telephony and high-speed data services. Unlike the traditional broadcast television services provided by the cable companies, these new information services typically require two-way communications capabilities. Therefore, many of the cable companies are upgrading their existing cable plants with two-way hybrid fiber-optic/coaxial cable (HFC) networks that will support the full-duplex, high-bandwidth applications of today and the future.

An exemplary HFC network for supporting both traditional broadcast video and new high-speed data services is shown in FIG. 1. The HFC network includes headend equipment 101 situated at the headend of the cable plant, signal processing equipment $104_1$–$104_n$ situated at the customer premises (collectively referred to as customer premise equipment 104), and an HFC network 102 comprising the communication network between the headend equipment and the customer premise equipment. For convenience, the signal path from the headend to the customer premises is referred to as the "forward path," while the signal path from the customer premises to the headend unit is referred to as the "return path."

The forward path is divided into a number of channels, where each channel is allocated a specific frequency band. In a typical HFC network, the forward path channels are allocated 6 MHz of bandwidth within the frequency range 50 MHz to 1 GHz. Some of the forward path channels are used to carry analog video carriers while other forward path channels are used to carry the digitally modulated carriers for the forward path data services. Each forward path data channel is supported by a headend transmitter (e.g., headend transmitter $106_n$) which formats and modulates user information for transmission to the customer premises over the HFC network. For convenience, the data channels carried in the forward path are referred to as "downstream channels."

Likewise, the return path is divided into a number of channels, where each channel is allocated a specific frequency band. In a typical HFC network, the return path channels are allocated between 200 KHz and 6.4 MHz of bandwidth within the frequency range 5 MHz to 42 MHz. The return path channels are used to carry the digitally modulated carriers for the return path data services (the broadcast video service typically does not require any return path services). Each return path data channel is supported by a headend receiver (e.g., headend receiver $108_n$) which demodulates the signal received from the customer premises. For convenience, the data channels carried in the return path are referred to as "upstream channels."

In the forward path, the digitally modulated carriers from the headend transmitters 106 are multiplexed together with the analog video carriers into a composite signal by multiplexer 110. The composite signal is carried by the HFC network 102 to the customer premises equipment 104. The HFC network 102 includes a forward path laser 112, which receives the composite signal from the headend equipment at a predetermined signal level and transmits the composite signal over the fiber-optic portion of the network to a forward path optical receiver 114. The forward path optical receiver 114 converts the optical signals from the forward path laser 112 into electrical signals and passes the electrical signals on to the coaxial cable portion of the network at two-way repeater 116. The coaxial cable portion of the network consists of a number of coaxial cable segments linked together, with two-way repeaters (such as two-way repeater 118) spaced at predetermined intervals along the coaxial cable segments to amplify the signals. Each customer premise connects into the coaxial cable network by way of a tap such as tap 120.

In the return path, the digitally modulated carriers generated at the customer premise equipment 104 are transmitted over the coaxial cable network by the series of two-way repeaters, such as two-way repeater 118. At the boundary between the coaxial cable portion of the HFC network and the fiber-optic portion of the HFC network, two-way repeater 116 passes the electrical signals on to return path laser 122 at a predetermined signal level. The return path laser 122 transmits the signal over the fiber-optic portion of the network to a return path optical receiver 124, which converts the optical signals from the return path laser 122 into electrical signals and passes the electrical signals on to the headend equipment 101. The headend equipment 101 includes a splitter, which feeds the return path signals to the headend receivers 108.

One factor affecting performance of the HFC system is the dynamic range of the lasers. Each laser has a power saturation point (PSAT) below which the laser is predominantly linear and above which the laser is severely non-linear. In order to effectively transmit user information, the transmit signal level applied to the laser must be within the linear range of the laser. Thus, the transmit signal level at which the laser reaches its PSAT represents a maximum transmit signal level that can be applied to the laser.

Another factor affecting performance of the HFC system is the inherent noise floor of the optical receiver. Each optical receiver has an inherent noise floor which represents the lowest receive signal level that the optical receiver can process reliably. The receive signal level present at the optical receiver is a function of the transmit signal level applied to the laser, the output power level of the laser, and the optical path loss. In order to effectively receive user information, the receive signal level must be above the optical receiver's inherent noise floor. Thus, the transmit signal level which produces a receive signal level equal to the optical receiver's inherent noise floor represents the minimum transmit signal level that can be applied to the laser.

An additional factor affecting only the return path in the HFC system is an accumulation of noise at the headend receiver caused by combining multiple return paths. It is common practice in current HFC systems to combine multiple return paths as shown in FIG. 2 in order to reduce the number of headend receivers needed to support the return path data service. The result of combining multiple return paths is that the summation of noise (a significant portion of which is caused by the optical receiver noise) from all of the return paths is present at the headend receiver. In order to effectively transport user information over the return path, the signal level for the user information must be above the cumulative noise. Thus, the transmit signal level which produces a receive signal level at the headend receiver equal to the cumulative noise represents the minimum transmit signal level that can be applied to the laser on the return path.

As a result, there is a window within which the transmit signal level applied to the laser must remain. This transmit signal level window is bounded at the high end by the maximum transmit signal level and at the low end by the minimum transmit signal level. Because the transmit signal level applied to the laser is itself a range of signal levels, it is imperative that the range of transmit signal levels applied to the laser be situated well within the transmit signal level window so that the strongest signal applied to the laser will not exceed the maximum transmit signal level and the weakest signal applied to the laser will not fall below the minimum transmit signal level.

In order to select an appropriate transmit signal level for the laser, the dynamic range of the laser (i.e., the maximum and minimum transmit signal levels) must be ascertained. In existing HFC systems, there is no reliable way for determining the dynamic range of the laser. Therefore, a need remains for a method and apparatus for evaluating dynamic range in an HFC system.

DETAILED DESCRIPTION

Figure 1:
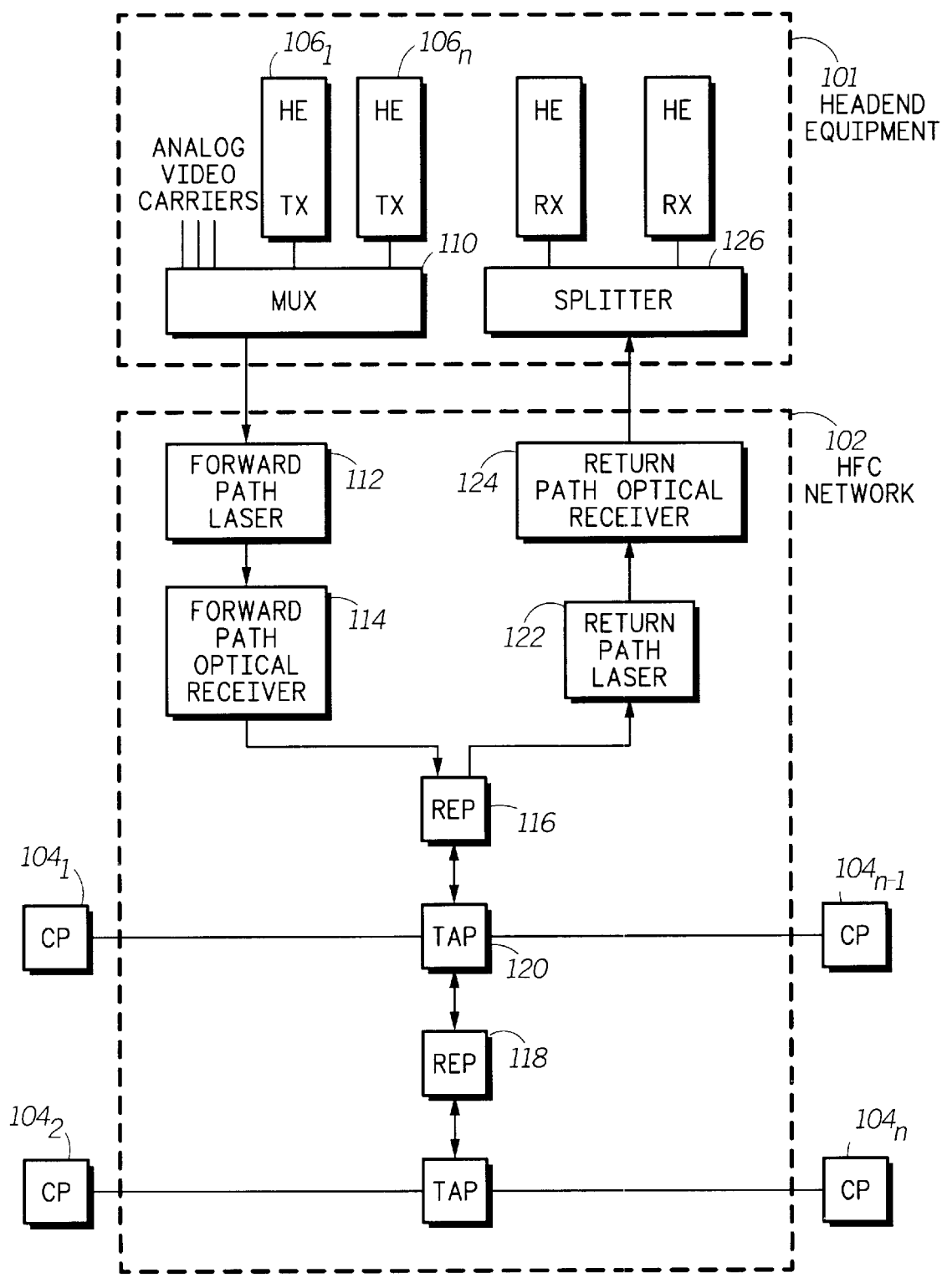
FIG. 1 is a block diagram of a hybrid fiber-optic/coaxial cable (HFC) network as is known in the art.
Figure 2:
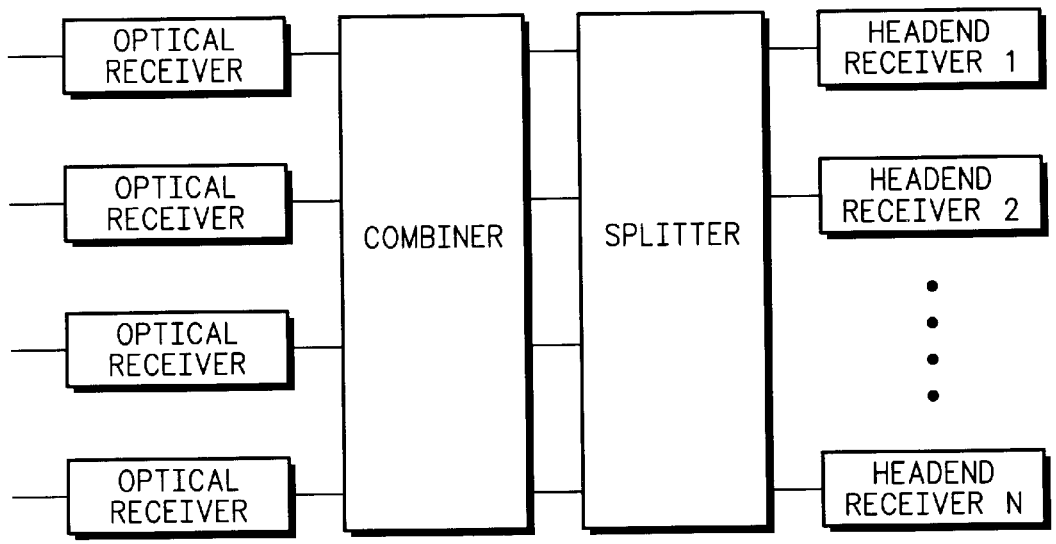
FIG. 2 is a block diagram showing the combination of multiple return paths in an HFC network as is known in the art.

As discussed above, the need remains for a method and apparatus for evaluating dynamic range in an HFC system. In an exemplary embodiment, a unique multiple tone test signal that emulates the probability density function of a composite wideband signal is utilized. The tones that comprise the multiple tone test signal fall within and are transmitted on a single designated channel on the path to be tested, and the effect of the multiple tone test signal is to provide a load for the transmitting laser substantially equivalent to a predetermined number of digitally modulated carriers transmitting simultaneously on multiple channels across the entire bandwidth of the test path. By keeping the transmitted tones within a single channel, the effects of the multiple tone test signal on the laser are easy to measure. A novel method for measuring the dynamic range of the path using the multiple tone test signal is described which can be done either manually using existing CATV analyzing equipment or automatically by a novel test apparatus (described below).

One advantage of the subject test signal is that the test signal is a narrowband signal that emulates a wideband composite signal. That is, the single test signal produces a load on the laser equivalent to a predetermined number of digitally modulated carriers that are simultaneously transmitting random (scrambled) data at randomly spaced carrier frequencies (i.e., carrier frequencies having no specific phase relationship). Furthermore, the test signal can be generated using a single piece of commercially-available equipment, and the test signal power level, which is varied in order to test the dynamic range of the test path, can be easily controlled. An alternate approach is to use actual modulated signals to produce an equivalent load on the laser, and, in fact, such a configuration was used for modeling the test signal under laboratory conditions. This requires multiple independent transmitters just to generate the modulated carriers, which would make field testing difficult simply because of the complexity of setting up the transmitters. Furthermore, testing for non-linearity with multiple carriers requires an Error Vector Magnitude measurement on the modulated signals, which is very time consuming and requires either a specially configured headend unit or a very expensive Vector Signal Analyzer such as the Hewlett-Packard Model HP-89441A Vector Signal Analyzer. Therefore, the subject test signal provides an easy and predictable way for placing a load on the laser.

Another advantage of the subject test signal is that all significant third-order intermodulation distortion (IMD) products (commonly referred to as Composite Triple Beat or CTB in the CATV industry) fall within the channels adjacent to the test channel, enabling the CTB power level to be measured using the standard adjacent channel power function supported by existing CATV analyzers such as the Hewlett-Packard Model HP-8591C CATV Analyzer and the Hewlett-Packard Model HP-4396A Spectrum Analyzer. This characteristic clearly distinguishes the present test signal from prior art test signals. One prior art test signal, defined in the IEEE document IEEE-STD-743-1984, uses a 4-tone signal with the tones centered near the center of the test channel to ensure that all of the IMD products fall within the test channel. Another prior art test signal, defined in the IEEE document IEEE-STD-743-1995, uses a 23-tone signal with the tones equally spaced across the entire test channel such that the IMD components fall both inside and outside of the test channel. Neither of these prior art test signals would allow the CTB power level to be measured using the standard adjacent channel power function of a CATV analyzer, and, in fact, neither of these prior art test signals were designed for use in a CATV system (both prior art test signals were designed for testing characteristics of a 4 KHz voiceband channel).

Figure 3:
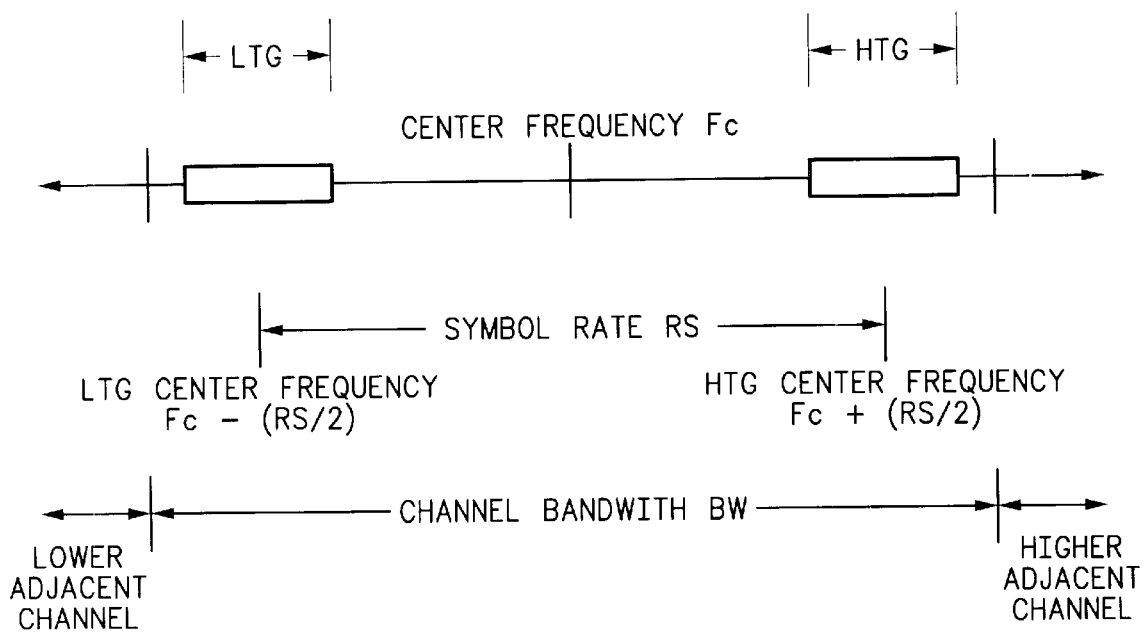
FIG. 3 is a depiction of the relationships between the center frequency, symbol rate, and tone groups of the subject test signal.

The test signal is constructed for transmission on a channel (referred to as the test channel) having a predetermined center frequency Fc and a predetermined channel bandwidth BW, such that the test signal emulates a number of digitally modulated carriers having a predetermined symbol rate RS and simultaneously transmitting on multiple channels. The test signal consists of an even number of predominantly sinusoidal tones that have a fixed phase relationship (i.e., all tones are derived from the same source such that the delay between different frequencies is constant), thus creating the largest peak-to-RMS factor possible with the fewest frequencies and occurring within a reasonably short period of time. Half of the tones are grouped below the center frequency Fc (referred to as the low tone group or LTG), and half of the tones are grouped above the center frequency Fc (referred to as the high tone group or HTG). The two tone groups are centered about the approximate band edges of the channel, such that the LTG is centered about Fc−(RS/2) and the HTG is centered about Fc+(RS/2). The tones in each group are equally spaced at a predetermined tone spacing interval Fs which is the same for both groups. The relationships between the center frequency Fc, channel bandwidth BW, symbol rate RS, and the high and low tone groups are depicted in FIG. 3.

The test signal parameters are adjustable over a wide range of values so that the test signal can be customized for a particular network or for emulating a particular network characteristic. For example, the test signal can be configured for transmission on a particular channel, or the test signal can be made to emulate a desired loading of the network. However, certain parameters may be constrained due to limitations in the CATV analyzer used to make the test measurements, and still others are chosen so as to decrease the time needed to make those test measurements. Also, the test signal parameters are interdependent, so that a change in one parameter may affect the selection of other parameters.

The test channel (i.e., center frequency Fc and channel bandwidth BW) on which the test signal is transmitted is generally selectable anywhere within the workable frequency range of the path being tested, and will provide the desired loading for the transmitting laser. However, in order to use the test signal for measuring the dynamic range of the test path, the test channel must be chosen such that the channels adjacent to the test channel are also within the workable range of the test path. Therefore, for practical reasons, the test channel is generally not chosen to be at the extreme low end or high end of the frequency range.

The symbol rate RS is typically chosen based on the desired loading to be emulated. The test signal emulates a predetermined number of digitally modulated carriers transmitting simultaneously at the selected symbol rate RS. The symbol rate RS, in turn, determines the maximum number of simultaneous carriers that the test path would be able to support. If the symbol rate RS is chosen so that the predetermined number of carriers emulated by the test signal is equal to the maximum number of carriers that the test path could support at that symbol rate, then the test signal effectively emulates a maximum loading condition of the test path (i.e., the condition that occurs when all carriers are on simultaneously).

The channel bandwidth BW is chosen so that the major third-order IMD products of the test signal (discussed below) fall outside of the test channel and within the channels adjacent to the test channel. Therefore, the channel bandwidth BW must be relatively close to the symbol rate RS. For convenience, the channel bandwidth BW is typically chosen to coincide with the channel bandwidth of an existing channel on the test path.

The tone spacing Fs is selected so that all of the tones fall within the channel bandwidth BW. Also, the selection of the tone spacing parameter may be constrained by the performance capabilities of the analyzer. Many analyzers use a hybrid sine-swept/FFT measurement technique for measuring channel power which requires that the power going through the resolution bandwidth filter for each FFT bin be substantially flat. When such an analyzer is used for measuring the adjacent channel power for the subject test signal, the tone spacing Fs must be significantly greater than the resolution bandwidth of the analyzer so that the power requirement is met, and the most accurate power measurement will be obtained if the tone spacing Fs is greater than twice the resolution bandwidth (i.e., the Nyquist rate) although this is not an absolute requirement for obtaining an acceptable power measurement. The resolution bandwidth of the analyzer is typically adjustable and is selected so as to decrease the amount of time needed to take the power measurement (i.e., the measurement time is inversely proportional to the resolution bandwidth). Thus, there is a trade-off between the resolution bandwidth, which is preferably set to a large value in order to decrease the test duration, and the tone spacing Fs, which must be significantly greater than the resolution bandwidth but small enough so that all tones fall within the channel bandwidth.

A critical element of the test signal is that the relationships between the symbol rate RS, the channel bandwidth BW, and the tone spacing Fs must be such that the major third-order IMD products of the test signal fall within the channels adjacent to the test channel. Because third-order IMD products can be expected to spread across multiple channels, some of the third-order IMD products will fall within the test channel, some of the third-order IMD products will fall within the adjacent channels, and some of the third-order IMD products will fall outside of the adjacent channels. It is critical that the most significant third-order IMD products fall within the adjacent channels. The following third-order IMD products are considered to be the most significant because they have relatively high power levels compared to the total third-order IMD power, and therefore must fall within the adjacent channels:

F1(H)+F2(H)−F3(L), which fall in the upper adjacent channel;

F1(L)+F2(L)−F3(H), which fall in the lower adjacent channel;

2F1(H)−F2(L), which fall in the upper adjacent channel; and

2F1(L)−F2(H), which fall in the lower adjacent channel, where F1, F2, and F3 are distinct tones and where (H) indicates any tone in the HTG and (L) indicates any tone in the LTG. The remaining third-order IMD products are not critical, either because they have relatively low power levels, or because they do not fall within the adjacent channels. Therefore, the following third-order IMD products are not required to fall within the adjacent channels:

F1(H)+F2(H)−F3(H), which fall back around the HTG;

F1(L)+F2(L)−F3(L), which fall back around the LTG;

F1+F2+F3, which fall outside of the adjacent channels;

2F1+F2, which fall outside of the adjacent channels; and

3F1, which fall outside of the adjacent channels.

The individual tones of the test signal are transmitted at substantially the same transmit power level, which is selectable and is used to control the RMS (total) power of the test signal. The RMS (total) power of the test signal is equal to:

$$RMS \text{ (Total) Power} = 10 * \log_{10}(10^{P1/10} + \ldots + 10^{PN/10}), \quad \text{Eq. 1}$$

where N is the number of tones in the test signal and Pi is the power of an individual tone i measured in dBmV (decibels relative to one millivolt). However, since each tone is transmitted at the same power level (i.e., Pi is constant for all i), the RMS (total) power of the test signal is estimated to be:

$$RMS \text{ (Total) Power} = 10 * \log_{10}(N * 10^{P1/10}) \text{ dBmV}, \quad \text{Eq. 2}$$

where P is the power of each individual tone. From equation 2, it can be determined that the individual tone power P is equal to:

$$P = -10 * \log_{10}(N) \text{ dBc} \qquad \text{Eq. 3}$$

and the power of each tone group is equal to:

$$TGP = 10 * \log_{10}((N/2) * 10^{P/10}) \text{ dBmV} = -3 \text{ dBc}, \qquad \text{Eq. 4}$$

where the indicator dBc (decibels relative to carrier) indicates the power level relative to the RMS (Total) Power.

The preferred test signal is a 22-tone signal which was designed predominantly for evaluating the return path of the HFC network. In a preferred embodiment, the upstream channels are allocated 600 KHz of bandwidth in the return path, and the data service supported on the return path utilizes/4-DQPSK modulation (a variant of QPSK modulation) at a symbol rate of 384,000 symbols per second (384 KHz). The preferred 22-tone test signal used for evaluating the return path has a center frequency Fc at 26.1 MHz, a channel bandwidth BW equal to 600 KHz, a symbol rate bandwidth RS equal to 400 KHz (rounded up from the 384 KHz symbol rate), and a tone spacing Fs of 5 KHz. The individual tone power P for the 22-tone signal is equal to −13.4 dBc, so the RMS (Total) Power for the 22-tone test signal is equal to P+13.4 dBmV.

The preferred center frequency Fc and channel bandwidth BW have been chosen to coincide with a typically unused upstream channel that is far enough away from Citizen's Band Radio, Amateur Radio, and Shortwave Radio frequencies to avoid significant interference from those sources. Otherwise, the preferred center frequency Fc and channel bandwidth BW have no particular significance. The center frequency Fc, in particular, can be easily changed without affecting the relationship among the other test signal parameters.

The preferred tone spacing Fs has been chosen so that the resolution bandwidth of the analyzer can be configured to a relatively large value, preferably 3 KHz. As a result, the power measurement can be completed by a typical analyzer in under one second. In contrast, it would take the same analyzer approximately 41 seconds to complete a power measurement using a resolution bandwidth equal to 300 Hz and a tone spacing Fs equal to 1 KHz.

Test simulations have shown that the peak power of the preferred 22-tone test signal is equivalent to the peak power of 72 Quadrature Phase Shift Keying (QPSK) digitally modulated carriers transmitting simultaneously at a power level of 18.6 dB below the 22-tone signal RMS power (i.e., −18.6 dBc) at a symbol rate RS equal to 384 KHz. Test simulations have also shown that the peak power of the 22-tone test signal is equivalent to the peak power of 36 16-point Quadrature Amplitude Modulation (16-QAM) digitally modulated carriers transmitting simultaneously at a power level of 15.5 dB below the 22-tone signal RMS power (i.e., −15.5 dBc) at a symbol rate RS equal to 384 KHz. Thus, the 22-tone narrowband signal produces the same load on the laser as would 72 QPSK modulated signals or 36 16-QAM modulated signals.

The 22-tone test signal can also be used to evaluate the forward path in the HFC network. The test signal is typically introduced into the forward path using an external mixer, an RF signal generator, and a bandpass filter that is wide enough to pass the signal. In the preferred embodiment, the downstream channels are allocated 6 MHz of bandwidth in the forward path, and the data service supported on the forward path utilizes 64-QAM modulation at a symbol rate of 5,000,000 symbols per second (5,000 KHz). The preferred 22-tone test signal used for evaluating the forward path has a symbol rate bandwidth RS equal to 5 MHz (5,000 KHz), such that the LTG and HTG for the preferred test signal are centered at Fc±2,500 KHz. The tone spacing Fs for the preferred test signal is chosen to be 50 KHz so that the resolution bandwidth of the CATV analyzer can be increased to 30 KHz in order to provide an acceptably low power measurement time.

In an exemplary embodiment, the 22-tone test signal is generated using a commercially available waveform generator such as the LeCroy LW-410A Single Channel Arbitrary Waveform Generator or the LeCroy LW-420A Dual Channel Arbitrary Waveform Generator. These particular waveform generators are capable of generating multiple tones having a fixed phase relationship, as required to obtain the largest peak-to-RMS factor for the fewest number of tones. The parameters for generating the 22-tone test signal are entered into the LeCroy waveform generators through front panel configuration menus or through a text-based configuration script which can be stored on a magnetic disk or other storage medium. The following is an exemplary configuration script for the LeCroy waveform generator for generating the preferred 22-tone test signal:

$X1 = 26.1M$ $X2 = 0.127$ $X3 = 2*PI*T$ $X4 = (SIN(X3*(X1+0.205M)) + SIN(X3*(X1-0.205M)))$ $X5 = (SIN(X3*(X1+0.210M)) + SIN(X3*(X1-0.210M)))$ $X6 = (SIN(X3*(X1+0.215M)) + SIN(X3*(X1-0.215M)))$ $X7 = (SIN(X3*(X1+0.220M)) + SIN(X3*(X1-0.220M)))$ $X8 = (SIN(X3*(X1+0.225M)) + SIN(X3*(X1-0.225M)))$ $X9 = (SIN(X3*(X1+0.2M)) + SIN(X3*(X1-0.2M)))$ $X10 = (SIN(X3*(X1+0.195M)) + SIN(X3*(X1-0.195M)))$ $X11 = (SIN(X3*(X1+0.190M)) + SIN(X3*(X1-0.190M)))$ $X12 = (SIN(X3*(X1+0.185M)) + SIN(X3*(X1-0.185M)))$ $X13 = (SIN(X3*(X1+0.180M)) + SIN(X3*(X1-0.180M)))$ $X14 = (SIN(X3*(X1+0.175M)) + SIN(X3*(X1-0.175M)))$ $X2*(X4+X5+X6+X7+X8+X9+X10+X11+X12+X13+X14)$ where X1 is the center frequency Fc (26.1 MHz), X2 is the peak voltage for each tone, and X3 is the sweep time for the test measurement. In this script, the tone group center frequency offset (200 KHz) and the individual tone spacing Fs (5 KHz) are hard-coded. The following is a general-purpose script in which all of the parameters are entered as parameters:

$X1 = 26.1M$ $X2 = 0.127$ $X3 = 2*PI*T$ $X4 = 0.2M$ $X5 = 0.005M$ $X6 = (SIN(X3*(X1+(X4+(1*X5)))) + SIN(X3*(X1-(X4+(1*X5)))))$ $X7=(SIN(X3*(X1+(X4+(2*X5))))+SIN(X3*(X1-(X4+(2*X5)))))$ $X8=(SIN(X3*(X1+(X4+(3*X5))))+SIN(X3*(X1-(X4+(3*X5)))))$ $X9=(SIN(X3*(X1+(X4+(4*X5))))+SIN(X3*(X1-(X4+(4*X5)))))$ $X10=(SIN(X3*(X1+(X4+(5*X5))))+SIN(X3*(X1-(X4+(5*X5)))))$ $X11=(SIN(X3*(X1+(X4+(0*X5))))+SIN(X3*(X1-(X4+(0*X5)))))$ $X12=(SIN(X3*(X1+(X4-(1*X5))))+SIN(X3*(X1-(X4-(1*X5)))))$ $X13=(SIN(X3*(X1+(X4-(2*X5))))+SIN(X3*(X1-(X4-(2*X5)))))$ $X14=(SIN(X3*(X1+(X4-(3*X5))))+SIN(X3*(X1-(X4-(3*X5)))))$ $X15=(SIN(X3*(X1+(X4-(4*X5))))+SIN(X3*(X1-(X4-(4*X5)))))$ $X16=(SIN(X3*(X1+(X4-(5*X5))))+SIN(X3*(X1-(X4-(5*X5)))))$ $X2*(X6+X7+X8+X9+X10+X11+X12+X13+X14+X15+X16)$ where X4 is the tone group center frequency offset (200 KHz) and X5 is the individual tone spacing Fs (5 KHz).

The 22-tone test signal can be used to determine both the maximum transmit power level (i.e., the PSAT of the laser) and the minimum transmit power level (i.e., the effective noise floor) for the optical path. The measurement techniques described herein take advantage of the known characteristics of the optical path relative to the transmit signal level applied to the laser. Specifically, when the signal level applied to the laser is large, the dominant impairment will be the result of the non-linearity of the laser, and when the signal level applied to the laser is small, the dominant impairment will be the noise floor in the optical receiver if the optical path loss is greater than 2 dB or a combination of the laser noise (REN) and optical receiver noise if the optical path loss is less than or equal to 2 dB.

An exemplary technique for determining the maximum transmit power level utilizes a new test measurement called the 22-Tone to Total Distortion Ratio (22T/TD). The 22T/TD is a measure of the total power of the 22-tone signal relative to the summation of the power measured in the adjacent channels which at a minimum represents third-order IMD (CTB) and Gaussian noise (i.e., the total distortion). The 22-tone signal is measured against the total distortion and not just against the third-order IMD products for two reasons. First, it is known in the art that the energy being measured in any given bandwidth which is in the presence of a complex waveform contains IMD together with noise, and that the IMD is not easily separated from and measured independently of the noise (see IEEE document IEEE-STD-743 1995 for a discussion of the total distortion measurement). Second, at high signal levels, the noise power is negligible relative to the IMD power, and therefore all adjacent channel power is attributed to distortion of the 22-tone test signal.

A 22T/TD measurement is taken by introducing the 22-tone test signal at the transmitting laser at a predetermined power level, and measuring the power levels in the test channel and the two adjacent channels at the optical receiver using an analyzer. The 22T/TD is equal to:

$$\text{Eq. 5:} \quad 22T/TD = RMS(\text{Total})\text{Power}/(PL+PH)$$
$$= RMS(\text{Total})\text{Power} - (10^{PL/10} + 10^{PH/10}),$$

where RMS (Total) Power is the power level measured in the test channel, PL is the power level measured in the lower adjacent channel, and PH is the power level measured in the higher adjacent channel. In general, it is expected that the power levels measured in the adjacent channels will be substantially equal. Using this assumption, the 22T/TD is also substantially equal to:

$$\text{Eq. 6:} \quad 22T/TD = TGP/PX$$
$$= TGP - 10^{PX/10},$$

where TGP is the power of one of the tone groups which was shown in Eq. 4 to be −3 dBc, and PX is the power level measured in one of the adjacent channels. Thus, the 22T/TD can be estimated by measuring the power level of one of the adjacent channels and either substituting the measured power level for both PL and PH in Eq. 5 or substituting the measured power level for PX in Eq. 6.

Figure 4:
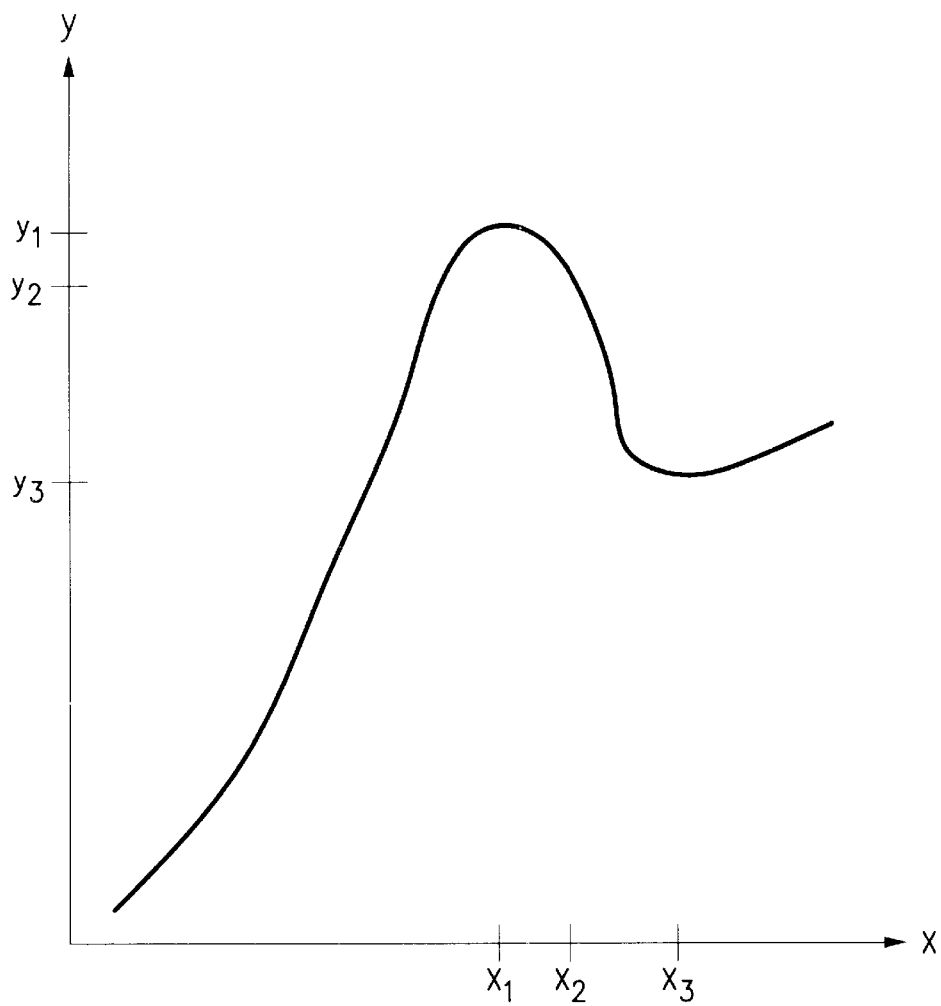
FIG. 4 is a representation of the relationship between the transmit power of an exemplary 22-tone test signal applied to the laser and the resulting 22-tone to total distortion ratio.

FIG. 4 shows roughly the relationship between the 22-tone transmit signal power applied to the laser, represented by the x-axis, and the resulting 22T/TD, represented by the y-axis. As the transmit power level is increased, the 22T/TD increases to a maximum at y1 when the transmit power level is x1. As the transmit power level is increased from x1, the 22T/TD gradually decreases to y2 at a transmit power level of x2. Increasing the transmit power level past x2 results in a rapid decrease in the 22T/TD, rolling off at y3 at a transmit power level of x3 and increasing again as the transmit power level is increased past x3.

The technique used to measure the PSAT of the laser works by gradually increasing the transmit power level of the 22-tone test signal from a predetermined initial transmit power level and monitoring the resulting 22T/TD levels. As the transmit power level is increased, the 22T/TD is expected to increase to be above the level y2. After the 22T/TD reaches its maximum value at y1 and the transmit power level continues to increase, the 22T/TD will gradually decrease to back to y2 and thereafter will decrease rapidly, possibly decreasing by 10 dB within an approximately 2 dB to 3 dB increase in transmit power level. This rapid decrease in the 22T/TD is a result of third-order IMD increasing in the adjacent channels as the laser approaches its PSAT. After this rapid decrease in the 22T/TD value, the vast majority of the adjacent channel power is caused by CTB distortion products which far outweigh the affects of the optical receiver noise floor. At this point, then, the 22T/TD is effectively a 22T/CTB measurement.

As the transmit power level continues to be increased, the decrease in 22T/TD will roll off at a transmit power level of x3 and will increase thereafter. This seeming improvement in 22T/TD is caused by a shift of the higher-order IMD products from the adjacent channels into channels beyond the adjacent channels as the laser exceeds its PSAT, resulting in a decrease in the power level measured in the adjacent channels, albeit at the expense of other channels as the total distortion increases, and therefore an increase in the 22T/TD. In actuality, the laser is at its PSAT when the transmit power level is x3, and will go into an overload condition if the transmit power level is increased too far beyond x3. Thus, the transmit power level applied to the laser is only increased to a level where x3 can be determined (i.e., where the 22T/TD begins to increase).

Lasers from two manufacturers were tested on the HFC return path using the technique described above. Although each manufacturer's lasers, and even different lasers from the same manufacturer, are likely to have variations in performance, the two test lasers had similar characteristics. Specifically, it was found that, for both lasers, the value y2 was approximately 40 dB and the drop in 22T/TD between y2 and y3 was approximately 10 dB for an increase in transmit power level between x2 and x3 of approximately 2 dB to 3 dB.

A major advantage of this testing technique is that the PSAT of the laser can be determined without excessively overloading the laser. Therefore, the test can be performed with minimal risk of permanently damaging the laser.

An exemplary technique for determining the minimum transmit power level utilizes a new test measurement called the 22-Tone to Noise Ratio (22T/N). The 22T/N is a measure of the total power of the 22-tone signal relative to the noise level in the test channel. Because is it difficult to measure the noise level in the test channel while the 22-tone test signal is being transmitted, the noise level in the test channel is estimated by measuring the power levels in the adjacent channels and determining the test channel noise level to be the average of the power levels measured in the adjacent channels. The adjacent channel power measurements are averaged in order to compensate for frequency-dependent non-linearities across the three channels of interest due to optical effects or filtering. Where such non-linearities are not present, the adjacent channel power can be used as an estimate of the test channel noise level, since the noise in each of the three channels is expected to be substantially equal.

The technique used to measure the optical path noise floor works by gradually decreasing the transmit power level of the 22-tone test signal from a predetermined initial transmit power level and monitoring the resulting 22T/N levels. As the transmit power level is decreased, the 22T/N is expected to decrease because the noise level remains substantially constant. The effective optical path noise floor is reached when the 22T/N is equal to a predetermined minimum value representing the minimum signal-to-noise ratio at which the modulation can operate. The transmit power level at which the 22T/N is equal to the predetermined minimum value is effectively the minimum transmit power level that can be applied to the laser.

These techniques for measuring the PSAT of the laser and the optical path noise floor are used for establishing a valid range within which to configure the transmit power level. In one embodiment, only the PSAT of the laser needs to be evaluated. Once the PSAT of the laser is known, the transmit power level is set so that the maximum signal level applied to the laser will be below the PSAT by a fixed amount, typically at least 3 dB. Using this technique, the transmit power level is likely to be set closer to the PSAT then to the optical path noise floor, so the transmit power level will remain within the dynamic range of the path. Preferably, a margin of at least 3 dB should be left on both the low-end and the high-end of the signal range.

In another embodiment, both the PSAT of the laser and the optical path noise floor is evaluated. Once the PSAT of the laser and the optical path noise floor have been determined, the transmit power level is centered within the dynamic range of the path, so that the margin of error on both the high-end of the signal range and the low-end of the signal range are substantially equal. When there is no combining of multiple return paths, then the dynamic range is bounded at the high-end by the PSAT of the laser and at the low-end by the optical path noise floor. However, where multiple return paths are combined, the dynamic range is narrowed due to the cumulative noise from the multiple receivers. While the dynamic range continues to be bounded at the high-end by the PSAT of the laser, the low-end must be increased to compensate for the added noise. In an exemplary embodiment, the low-end of the dynamic range is increased by 3 dB if two return paths are combined, 5 dB if three return paths are combined, 6 dB if four return paths are combined, 8 dB if six return paths are combined, and 9 dB if eight return paths are combined. Again, it is preferable that a margin of at least 3 dB be left on both the low-end and the high-end of the signal range.

Figure 5:
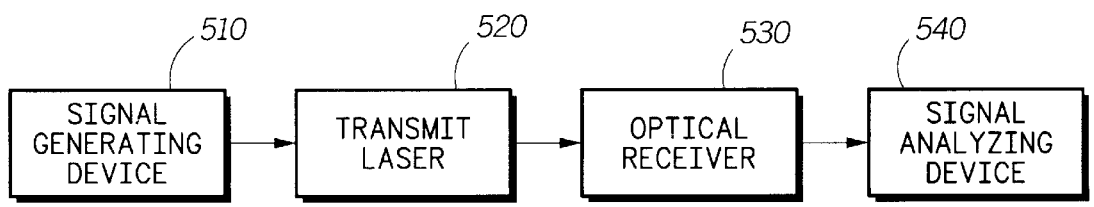
FIG. 5 is a block diagram of a system for evaluating dynamic range in a communication network.

A system for evaluating dynamic range in a communication network is shown in FIG. 5. A signal generating device 510 transmits the test signal on the test channel at a predetermined signal power level. The test signal is transmitted over the fiber-optic network by transmit laser 520 and received by optical receiver 530. A signal analyzing device 540 measures distortion of the test signal by measuring the signal power in the test channel and by measuring the signal power in the adjacent channels. From the signal power measurements, the signal analyzing device 540 derives a quantized value, such as a ratio of the received signal power to the total distortion power or a ratio of the received signal power to the noise power. The quantized value is then selectively output in human perceivable form.

While the preferred embodiments utilize a 22-tone signal, the test signal is not restricted to 22 tones. A test signal having fewer tones (e.g., a 10-tone test signal) may be useful for emulating fewer transmitters, while a test signal having a greater number of tones may be useful for emulating additional transmitters or for driving the laser to saturation sooner. However, a test signal having too many tones may overload the laser and cause permanent damage to the laser.

Furthermore, although the channel bandwidth and center frequency for the test channel is typically chosen to coincide with the channel bandwidth and center frequency of an existing channel, an alternate embodiment allows the entire test to be performed within a single existing channel. The alternate embodiment uses the center frequency Fc of the existing channel, but selects the channel bandwidth of the test channel to be one-third of the channel bandwidth of the existing channel. In this way, the adjacent channels also fall within the existing channel bandwidth.

The present invention may be embodied in other specific forms without departing from the spirit or essential characteristics. The described embodiments are to be considered in all respects only as illustrative and not restrictive.

What is claimed is:

1. A system for evaluating dynamic range in a communication network, the communication network supporting at least a test channel having a predetermined center frequency, a first channel adjacent to the test channel, and a second channel adjacent to the test channel, the system comprising:

a signal generating device for transmitting a test signal on the test channel at a predetermined signal power level;

a signal analyzing device for measuring distortion of the test signal, the signal analyzing device comprising:

means for measuring power in the test channel to obtain a test channel power level;

means for measuring power in the first adjacent channel to obtain a first adjacent power level;

means for measuring power in the second adjacent channel to obtain a second adjacent power level; and means for summing the first adjacent channel power level and the second adjacent power level to obtain a total distortion power level; and means for determining, based on said distortion measurement, whether the signal power level is within a range of valid signal power levels; the means for determining comprising:

means for quantizing the distortion of the test signal as a ratio of the test channel power level relative to the total distortion power level;

means for comparing the quantized value to a set of predetermined quantized values; and means for determining whether the quantized value is the minimum among the set of quantized values.

2. The system of claim 1 wherein the test signal comprises a narrow band signal for emulating a wide band composite signal.

3. The system of claim 2 wherein the narrow band signal comprises a multiple tone signal, wherein the tones of the multiple tone signal fall within the test channel and wherein the major third-order intermodulation distortion products of the tones fall within the adjacent channels.

4. The system of claim 3 wherein the multiple tone signal comprises a first group of predominantly sinusoidal tones and a second group of predominantly sinusoidal tones, said first tone group and said second tone group having an equal number of equally spaced tones, said first tone group centered about the center frequency minus a predetermined frequency offset, said second tone group centered about the center frequency plus the predetermined frequency offset.

5. The system of claim 4 wherein the major third-order intermodulation distortion products include:

$F1(H)+F2(H)-F3(L)$;

$F1(L)+F2(L)-F3(H)$;

$2F1(H)-F2(L)$;

and $2F1(L)-F2(H)$;

where F1, F2, and F3 are distinct tones and where (H) indicates any tone in the first tone group and (L) indicates any tone in the second tone group.

6. The system of claim 1 wherein the signal analyzing device comprises:

means for measuring power in the test channel to obtain a test channel power level;

means for measuring power the first adjacent channel to obtain a first adjacent channel power level;

means for measuring power in the second adjacent channel to obtain a second adjacent channel power level; and means for averaging the first adjacent channel power level and the second adjacent channel power level to obtain a noise power level.

7. The system of claim 6 wherein the means for determining whether the signal power level is within the range of valid signal power levels comprises:

means for determining whether the test channel power level relative to the noise power level is at least equal to a predetermined minimum signal-to-noise threshold.

8. The system of claim 7 wherein the predetermined minimum signal-to-noise threshold is dependent upon a predetermined modulation technique.

* * * * *